United States Patent [19]
Shin

[11] Patent Number: 6,130,945
[45] Date of Patent: Oct. 10, 2000

[54] CELLULAR PHONE CASE

[75] Inventor: Gi Seoup Shin, Seoul, Rep. of Korea

[73] Assignee: Hwasung Collection Co., Ltd., Seoul, Rep. of Korea

[21] Appl. No.: 08/897,290

[22] Filed: Jul. 21, 1997

[30] Foreign Application Priority Data

Jun. 18, 1997 [KR] Rep. of Korea ............... 97-14701 U
Jul. 9, 1997 [KR] Rep. of Korea ............... 97-18047 U

[51] Int. Cl.[7] .................................................. H04M 1/00
[52] U.S. Cl. ........................... 379/455; 455/90; 455/575
[58] Field of Search .................................. 455/403, 550, 455/575, 90; 379/137, 138, 455, 466

[56] References Cited

U.S. PATENT DOCUMENTS

| | | | |
|---|---|---|---|
| 4,736,418 | 4/1988 | Steadman | 379/451 |
| 5,101,504 | 3/1992 | Lenz | 455/90 |
| 5,123,044 | 6/1992 | Tate | 455/90 |
| 5,668,867 | 9/1997 | Nagai | 455/90 |
| 5,711,013 | 1/1998 | Collett et al. | 455/90 |
| 5,719,935 | 2/1998 | Ma | 379/433 |
| 5,883,966 | 3/1999 | Kubo | 455/90 |

*Primary Examiner*—Emanuel Todd Voeltz
*Assistant Examiner*—M. David Sofocleous
*Attorney, Agent, or Firm*—Ladas & Parry

[57] ABSTRACT

A cellular phone case provided with a sound collecting means for collecting the sound from a hearing portion of a cellular phone. The sound collecting means comprises a cover having an sound collecting portion being protrudly formed to surround an ear and a first opening being formed at the bottom of the sound collecting portion, the interior of the sound collection portion being empty, a cushion member positioned in the interior of the sound collecting portion, and a base sheet having a second opening therein being formed substantially coincide with the first opening to encircle the hearing portion of the cellular phone, said base sheet being attached at the bottom of the cover and the edge thereof being attached to the cellular phone case.

8 Claims, 6 Drawing Sheets

CELLULAR PHONE CASE

BACKGROUND OF THE INVENTION

1. Field of the Invention

The present invention relates to a cellular phone case, and more particularly to a cellular phone case provided with a sound collecting means for increasing the hearing efficiency.

A portable communication instrument, such as a cellular phone and a walky-talky, is generally used in a case which protects the contents therein and gives a pleasant touch.

2. Description of the Prior Art

Such a cellular phone case according to a prior art is shown in FIG. 1. A case opening(11) is formed in the upper side of the cellular phone case(10). The case opening(11) surrounds the outer periphery of a hearing portion(22) from which sound comes out. This type of cellular phone case has no function of collecting the sound from the hearing portion (22), so the cellular phone(20) should be closely contacted to ear. When the cellular phone(20) is used outside, one has to push the cellular phone(20) further toward the ear in order to hear the voice better because of the noise. If he cannot hear the voice from the cellular phone well, he may raise his voice. This would hurt others' feeling.

SUMMARY OF THE INVENTION

Accordingly, it is an object of the present invention to provide a cellular phone case provided with a sound collecting means for collecting the sound from a hearing portion of a cellular phone, whereby increasing the hearing efficiency and giving a soft touch to an ear when the sound collecting means is contacted to the ear.

It is another object of the present invention to provide a sound collecting means which may be attached directly to a cellular phone.

In accordance with one aspect of the present invention there is provided a cellular phone case provided with a sound collecting means for collecting the sound from a hearing portion of a cellular phone, the sound collecting means comprising a cover having an sound collecting portion being protrudly formed to surround an ear and a first opening being formed at the bottom of the sound collecting portion, the interior of the sound collection portion being empty, a cushion member positioned in the interior of the sound collecting portion, and a base sheet having a second opening therein being formed substantially coincide with the first opening to encircle the hearing portion of the cellular phone, said base sheet being attached at the bottom of the cover and the edge thereof being attached to the cellular phone case.

In accordance with another aspect of the present invention there is provided a cellular phone case provided with a sound collecting means for collecting the sound from a hearing portion of a cellular phone, the sound collecting means comprising a cover having an sound collecting portion being protrudly formed to surround an ear and a first opening being formed at the bottom of the sound collecting portion, and a base sheet having a second opening therein being formed substantially coincide with the first opening to encircle the hearing portion of the cellular phone, said base sheet being attached at the bottom of the cover and the edge thereof being attached to the cellular phone case.

In accordance with still another aspect of the present invention there is provided a cellular phone case provided with a sound collecting means, wherein the periphery of the second opening has a flange extended to encircle the hearing portion of the cellular phone with elasticity.

In accordance with another aspect of the present invention there is provided a sound collecting means comprising a cover having an sound collecting portion being protrudly formed to surround an ear and a first opening being formed at the bottom of the sound collecting portion, the interior of the sound collection portion being empty, a cushion member positioned in the interior of the sound collecting portion, and a base sheet having a second opening therein being formed substantially coincide with the first opening to encircle the hearing portion of the cellular phone, said base sheet being attached at the bottom of the cover and the edge thereof being attached to the cellular phone case, and said sound collecting means being attachable directly to the cellular phone by any adhesive means.

The characteristics of the present invention will be understood more fully from the following detail description and accompanying drawings showing a preferred embodiment of the invention.

DESCRIPTION OF THE PREFERRED EMBODIMENTS

Figure 1:
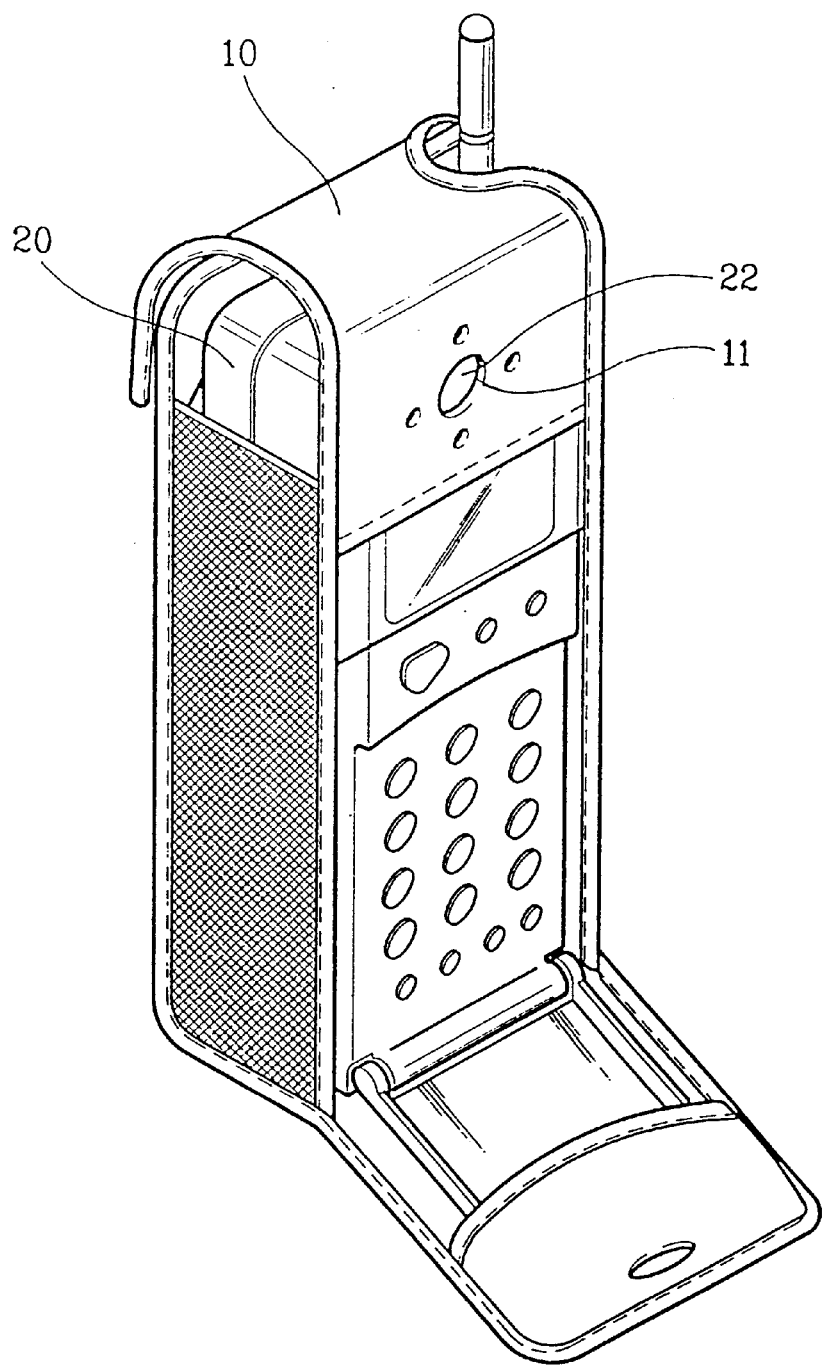
FIG. 1 is a perspective view of a cellular phone case according to a prior art.
Figure 2:
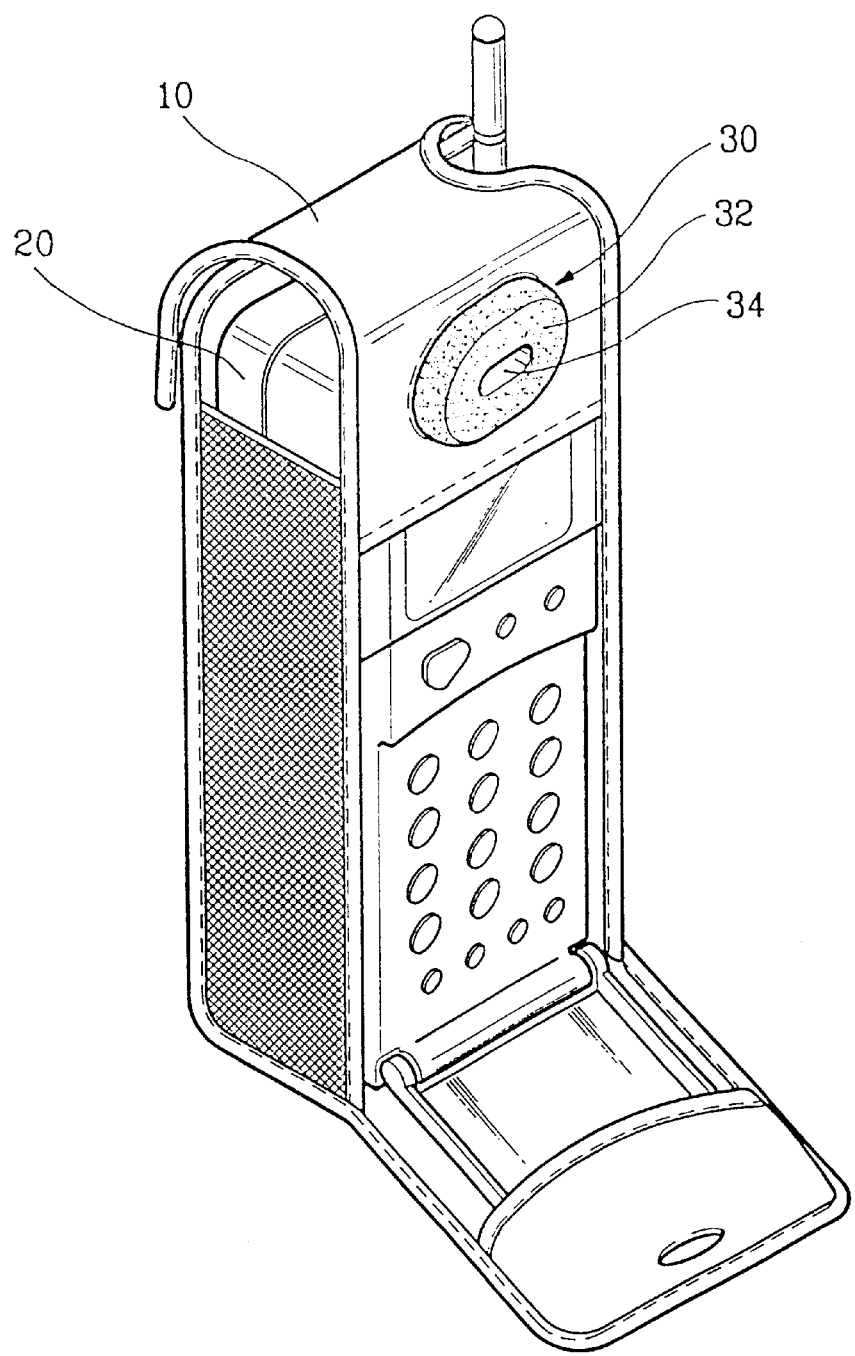
FIG. 2 is a perspective view of a cellular phone case according to a preferred embodiment of the present invention.
Figure 3:
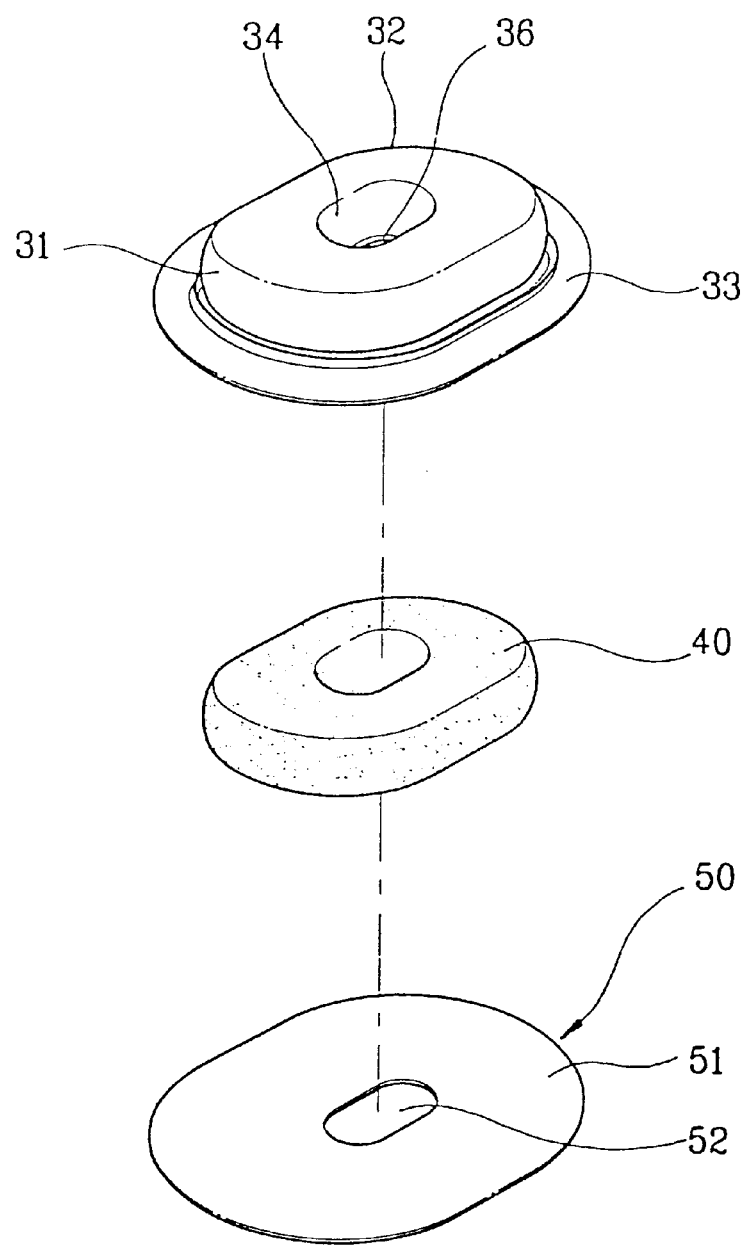
FIG. 3 is an exploded perspective view of a sound collecting means of FIG. 2.

FIG. 2 shows a perspective view of a cellular phone case according to a preferred embodiment of the present invention, and FIG. 3 shows an exploded perspective view of a sound collecting means of FIG. 2. A sound collecting portion(34) for collecting the sound is protrudly formed in the center of the cover(32). The sound collecting portion(34) has a first opening(36) formed at bottom side thereof. The interior of the sound collecting portion(34) is empty. The cover(32) is made of a material which is soft and can restore its original shape. A cushion member(40) like a sponge is inserted in the inner space formed in the sound collecting cover(32). With this, base sheet(50) is attached to the cover edge(33) at the back side of the cover(32), preferably fused in radio heating. A second opening(52) coinciding with the first opening(36) is formed in the base sheet(50). The second opening(52) is fused with the first opening(36) to form a single through hole(53, see FIG. 5). The through hole(53) encircles the hearing portion(22) having several small holes. The base sheet edge(51) is larger than outer periphery of the cover(32), and attached to the inside of the cellular phone case(10), preferably sewed with the cellular phone case(10) at the back side of the case hole(12)(see FIG. 4). Whereby, sound collecting means(30) is protruded from the cellular phone case(10). Accordingly, sound collecting means(30) collects the sound from the hearing portion(22) well, which eventually improves the hearing efficiency. Additionally, as the sound collecting means(30) has a cushion ability, it provides a soft touch to an ear.

Figure 4:
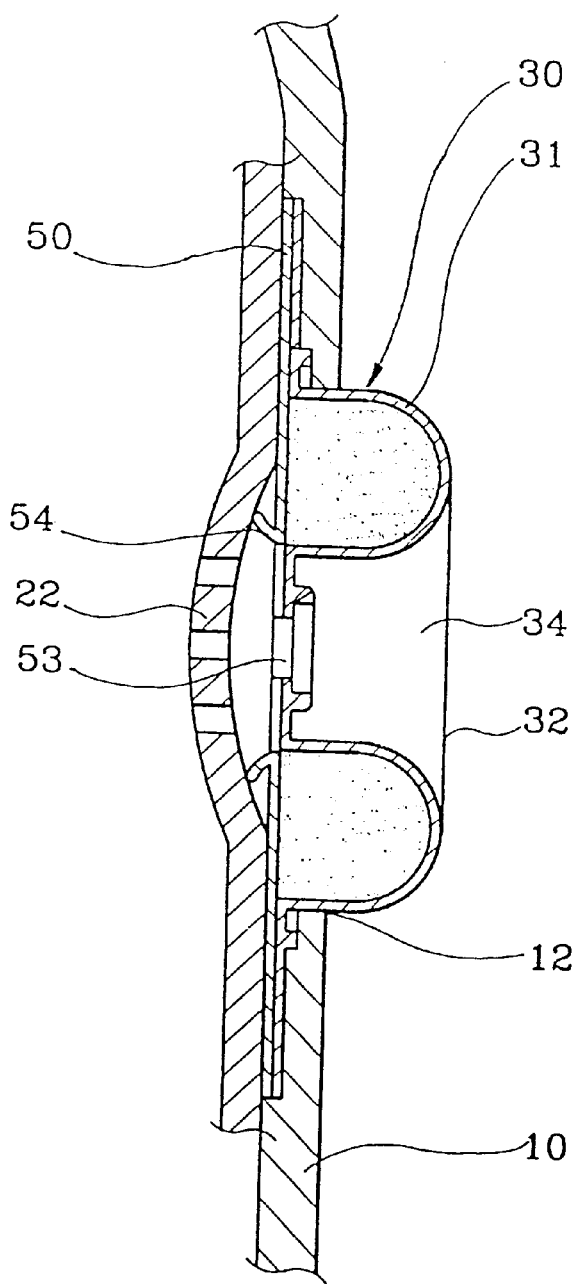
FIG. 4 is a side section view of a sound collecting means according to another preferred embodiment of FIG. 2.

FIG. 4 shows an exploded perspective view of a sound collecting means according to another preferred embodiment of FIG. 2. The periphery of the second opening(52) has a flange(54) extended to encircle the hearing portion(22) of the cellular phone(20) with elasticity. Thus, the sound from the hearing portion(22) may be collected more efficiently. The cover(32) and the cushion member(40) may be formed integrated. The cover(32), the cushion member(40), and the base sheet(50) may also be formed integrated, but it is preferable to make each element separately as described above to improve cushion efficiency and to give soft touch. Though the shape of the sound collecting means(30) is substantially an oval in the preferred embodiment of the invention, various shapes may be practiced.

Figure 5:
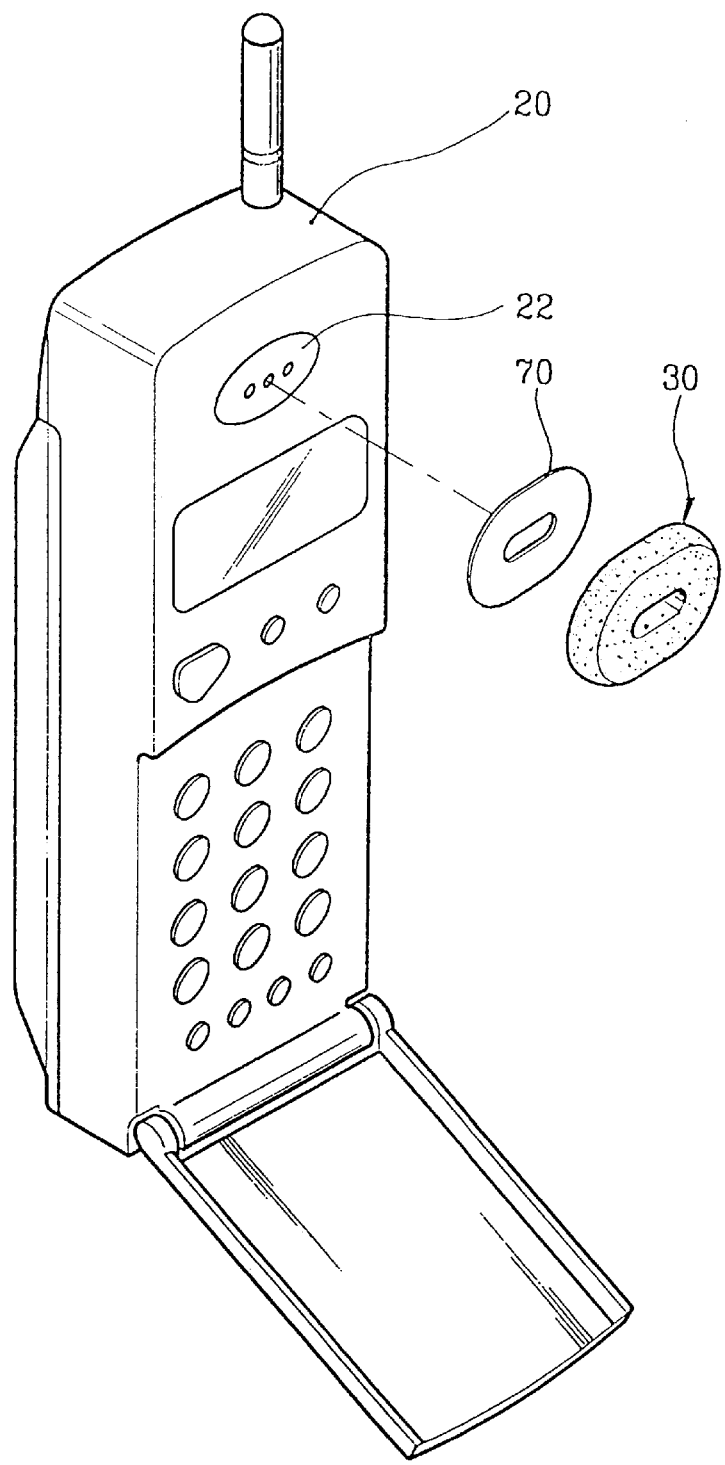
FIG. 5 is another preferred embodiment of a sound collecting means according to a preferred embodiment of the present invention.
Figure 6:
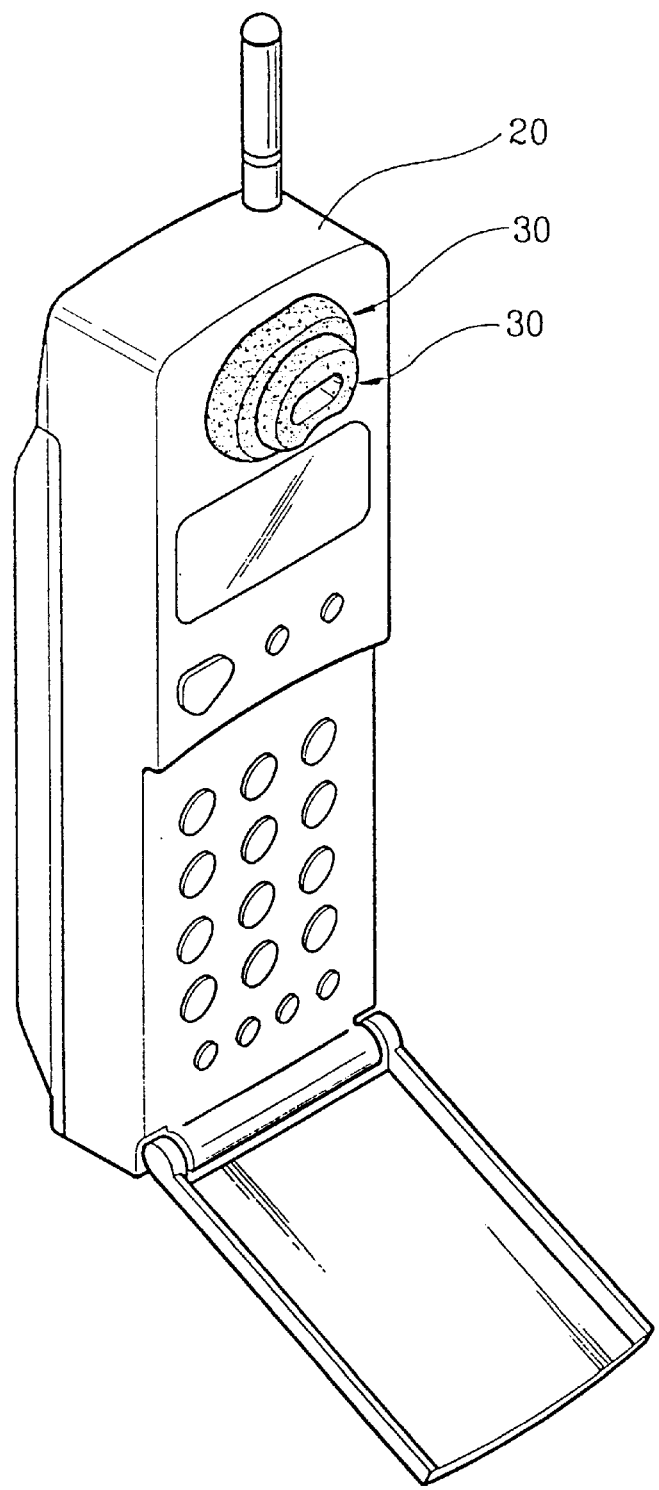
FIG. 6 is another preferred embodiment of FIG. 5.

FIG. 5 shows another preferred embodiment of a sound collecting means according to a preferred embodiment of the present invention. The sound collecting means(30) is similar to the sound collecting means described above with reference to FIG. 2, while the base sheet edge(51) is eliminated. The sound collecting means(30) may be attached directly to the cellular phone by any known adhesive means(70). Additionally, two sound collecting means(30) each having a same size or a different size may be stacked adhesively as shown in FIG. 6, which provides more high sound collecting efficiency.

The sound collecting means and according to the preferred embodiment of the invention may be employed in any case for portable communication equipment such as walky-talky.

It is understood that the foregoing description is only illustrative of the preferred embodiment of the invention. Various alternatives and modifications can be devised by those skilled in the art without departing from the invention. Thus, the present invention is intended to cover all such alternatives and modifications which fall within the scope of the appended claims.

What is claimed is:

1. A cellular phone case provided with a sound collecting means for collecting the sound from a hearing portion of a cellular phone, the sound collecting means comprising:
    a cover having a sound collecting portion protrudingly formed to surround an ear and a first opening formed at the bottom of the sound collecting portion, the interior of the sound collection portion being empty,
    a cushion member positioned in the interior of the sound collecting portion, and
    a base sheet having a second opening substantially coinciding with the first opening, said base sheet disposed between the hearing portion of the cellular phone and cover with a side thereof being attached to the cellular phone case directly.

2. A cellular phone case provided with a sound collecting means for collecting the sound from a hearing portion of a cellular phone, the sound collecting means comprising:
    a cover having a sound collecting portion protrudingly formed to surround an ear and a first opening formed at the bottom of the sound collecting portion, and
    a base sheet having a second opening substantially coinciding with the first opening, said base sheet disposed between the hearing portion of the cellular phone the cover with a side thereof being attached to the cellular phone case.

3. The cellular phone case, as set forth in claim 2 or claim 2, wherein the periphery of the second opening has a flange extended to encircle the hearing portion of the cellular phone with elasticity.

4. A sound collecting means for collecting the sound from a hearing portion of a cellular phone, the sound collecting means comprising:
    a cover having a sound collecting portion protrudingly formed to surround an ear and a first opening formed at the bottom of the sound collecting portion, the interior of the sound collection portion being empty,
    a cushion member positioned in the interior of the sound collecting portion, and
    a base sheet having a second opening substantially coinciding with the first opening said base sheet disposed between the hearing portion of the cellular phone, and the cover with a side thereof attached to the cellular phone case directly to the cellular phone by adhesive means.

5. A sound collecting means for collecting the sound from a hearing portion of a cellular phone, the sound collecting means comprising:
    a cover having a collecting portion protrudingly formed to surround an ear and a first opening formed at the bottom of the sound collecting portion, and
    a base sheet having a second opening substantially coinciding with the first opening, said base sheet disposed between the hearing portion of the cellular phone, and the cover with a side thereof being attached to the cellular phone case directly by adhesive means.

6. The sound collecting means, as set forth in claim 4, wherein a surface of the sound collecting means is adapted for stacking other sound collecting means thereon.

7. In a case for a cellular phone, the case having a sound-delivery structure for delivering sound from a hearing portion of the cellular phone to a user, the improvements of the sound-delivery structure comprising:
    a base member directly on the cellular phone, the base member having an opening at the hearing portion of the cellular phone;
    a cover member having an opening substantially aligned with the opening in the base member and protruding from the case away from the cellular phone and base member thereon for engaging an ear of the user about the opening in the cover member; and
    a cushion structure between the base and cover members about the openings.

8. The case according to claim 7, wherein the cover member is flexable for flexure with the cushion structure.

* * * * *